United States Patent
Radke

[15] 3,694,003
[45] Sept. 26, 1972

[54] PRESSURE RELIEF PANELS FOR GAS BAG EQUIPPED VEHICLES

[72] Inventor: Donald G. Radke, Troy, Mich.

[73] Assignee: Allied Chemical Corporation, New York, N.Y.

[22] Filed: Jan. 11, 1971

[21] Appl. No.: 105,443

[52] U.S. Cl.......280/150 AB, 180/112, 292/DIG. 65, 49/141
[51] Int. Cl..............................................B60r 21/08
[58] Field of Search ...280/150 AB, 150 B; 296/84 K, 296/137 R; 244/121, 122 AF; 180/82, 111, 112, 113, 69 C; 292/DIG. 65; 49/141; 98/2.18

[56] References Cited

UNITED STATES PATENTS

| | | |
|---|---|---|
| 2,469,159 | 5/1949 | Dombrowiak...........49/141 X |
| 2,188,891 | 1/1940 | Haltenberger...........180/69 C |
| 3,495,675 | 2/1970 | Hass et al...........280/150 AB |
| 3,112,535 | 12/1963 | Kinney......................49/31 X |
| 3,139,721 | 7/1964 | Daubenspeck........244/121 X |
| 3,525,296 | 8/1970 | Haapanen....................98/2.18 |
| 3,527,472 | 9/1970 | Chute et al..........280/150 AB |
| 3,561,703 | 2/1971 | Stencel................244/122 AF |
| 3,588,142 | 6/1971 | Gorman..............280/150 AB |

Primary Examiner—Kenneth H. Betts
Attorney—Marvin Bressler and Jonathan Plaut

[57] ABSTRACT

A pressure relief means is provided in a vehicle equipped with a gas bag restraint system for use in the event the vehicle is involved in an impact. A biased panel, in communication with the passenger compartment and the vehicle surroundings, is held down against the bias of the panel, which urges the panel open. Upon impact of the vehicle, the gas bags inflate, tending to increase the pressure in the passenger compartment. Simultaneously, the panel hinges are detonated, causing the panel to open to prevent the buildup of pressure in the passenger compartment of the vehicle.

8 Claims, 4 Drawing Figures

PATENTED SEP 26 1972
3,694,003
SHEET 1 OF 2
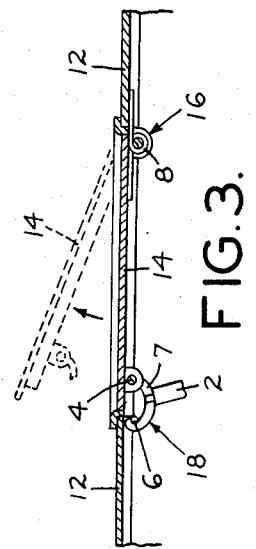
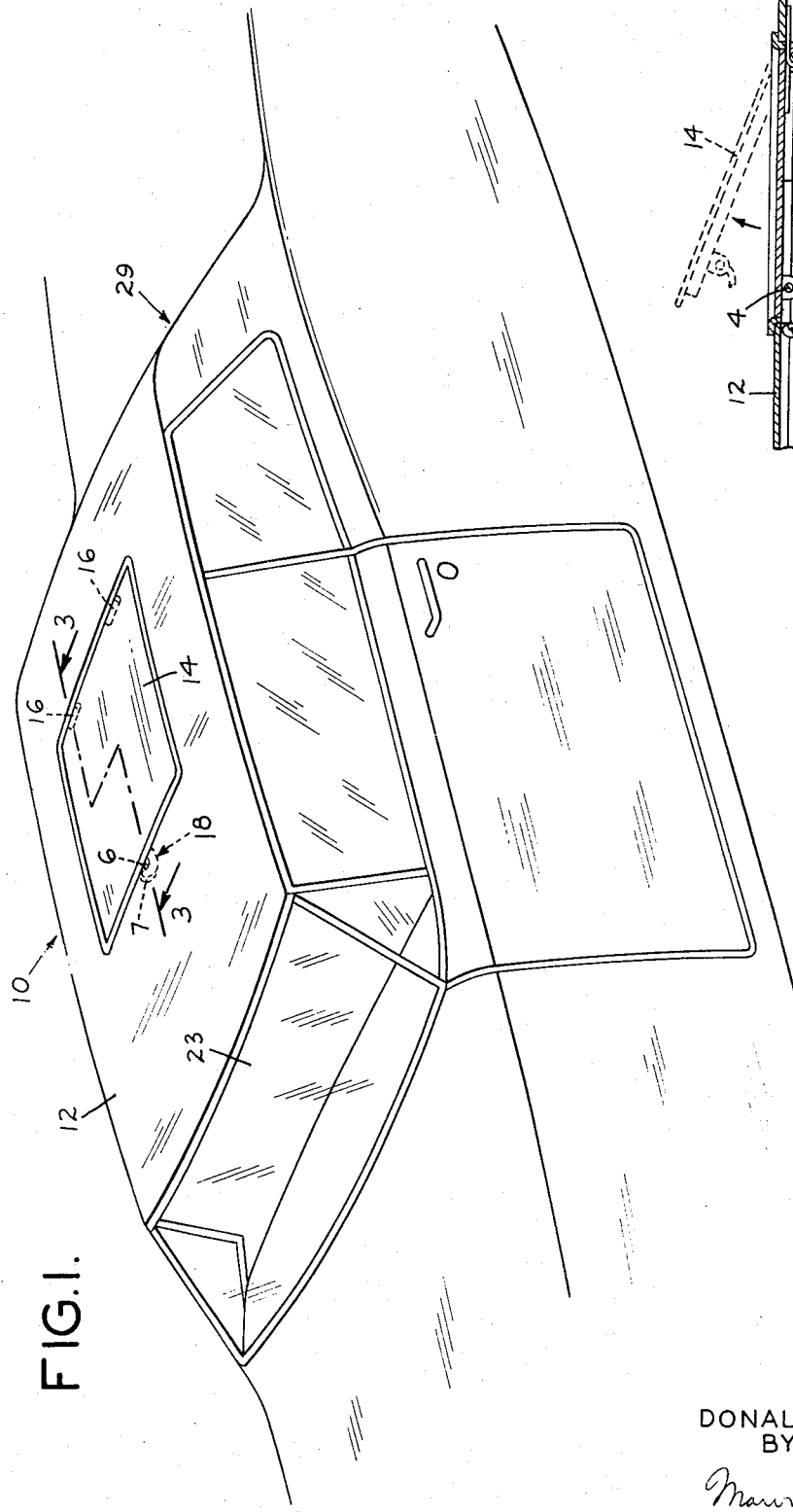
INVENTOR
DONALD G. RADKE
BY
Marvin Bressler
ATTORNEY INVENTOR
DONALD G. RADKE
BY
Marvin Bressler
ATTORNEY

PRESSURE RELIEF PANELS FOR GAS BAG EQUIPPED VEHICLES

BACKGROUND OF THE DISCLOSURE

The instant invention is directed to a method and apparatus for preventing pressure buildup in a vehicle equipped with a gas bag restraint system. More specifically, the instant invention is directed to a method and apparatus in which a biased panel, disposed on a vehicle, in communication with the passenger compartment of a vehicle and the vehicle surroundings, is opened simultaneously with the inflation of the gas bags, upon impact of the vehicle.

The use of inflatable gas bags as a vehicle constraining means has been proposed as a substitute for presently employed seat belts. Although seat belts provide excellent protection against serious injury in vehicle impacts and accidents, they suffer from the defect that their use, by occupants of the vehicle is voluntary. Thus, they are often not used. Gas bag restraint means, on the other hand, are not voluntary. Gas bags inflate upon impact automatically.

Although gas bag restraint systems are an advance over seat belts, they suffer from certain defects, which have not been solved by the prior art. One major defect is the passenger compartment pressure buildup which occurs simultaneously with the inflation of gas bags. As the bags inflate they compress the air in the passenger compartment. The resultant pressure buildup may cause structural damage to the interior of the passenger compartment since passenger compartment components are usually not designed to withstand any pressure gradient. Moreover, increased pressures increases noise amplitude. Since gas bag inflation is accompanied by a loud noise, pressure elevation using some gas bag systems may result in intolerable noise levels, unsafe to the occupants of the vehicle.

Gas bag inflation must be very rapid in order to constrain vehicle occupants immediately after vehicle impact. Thus, even if the vehicle windows are partially opened, the rate of escape of high pressure air from the passenger compartment may not equal the rate of pressure buildup in the passenger compartment resulting from gas bag inflation using certain configurations. Thus, unless the windows are fully opened, the problem of increased pressure in the passenger compartment using certain air bag systems may be significant. Obviously, in cold climates windows are not usually opened. Moreover, even in hot weather the ever increasing number of cars equipped with air conditioning dictate against opened windows. Thus, until now, the problem of pressure buildup in the passenger compartment of a vehicle has been a serious drawback to the use of certain inflatable gas bag systems as a restraint means in vehicles.

SUMMARY OF THE INVENTION

The instant invention is directed to a method and apparatus in which automatic means are provided for pressure relief of the passenger compartment of a vehicle equipped with gas bags, simultaneously with the inflation of the gas bags following an impact of the vehicle.

In accordance with the instant invention, a method and apparatus is provided for prevention of pressure buildup in the passenger compartment of a vehicle accompanying inflation of gas bags, disposed therein, following impact. To prevent pressure buildup, a panel, in communication with the passenger compartment of the vehicle and the vehicle surroundings, is disposed on the vehicle. Biased hinge means, urging the panel toward the open position, connects the panel to the frame of the vehicle. A hold down means, also connects the panel to the frame of the vehicle. The hold down means maintains the panel in the closed position against the urging of the bias means toward the open position. Detonator means, connected to the hinge means and in electrical communication with the signal which initates gas bag inflation, explodes the hinge means upon gas bag inflation, causing the panel to open and prevent pressure buildup in the passenger compartment following impact.

BRIEF DESCRIPTION OF THE DRAWINGS

The instant invention may be better understood by reference to the accompanying drawings of which:

FIG. 1 is a schematic representation of a vehicle equipped with the pressure relief means of the instant invention;

FIG. 3 is a sectional elevation view taken along plane 3—3 of FIG. 1; and

DETAILED DESCRIPTION

Figure 2:
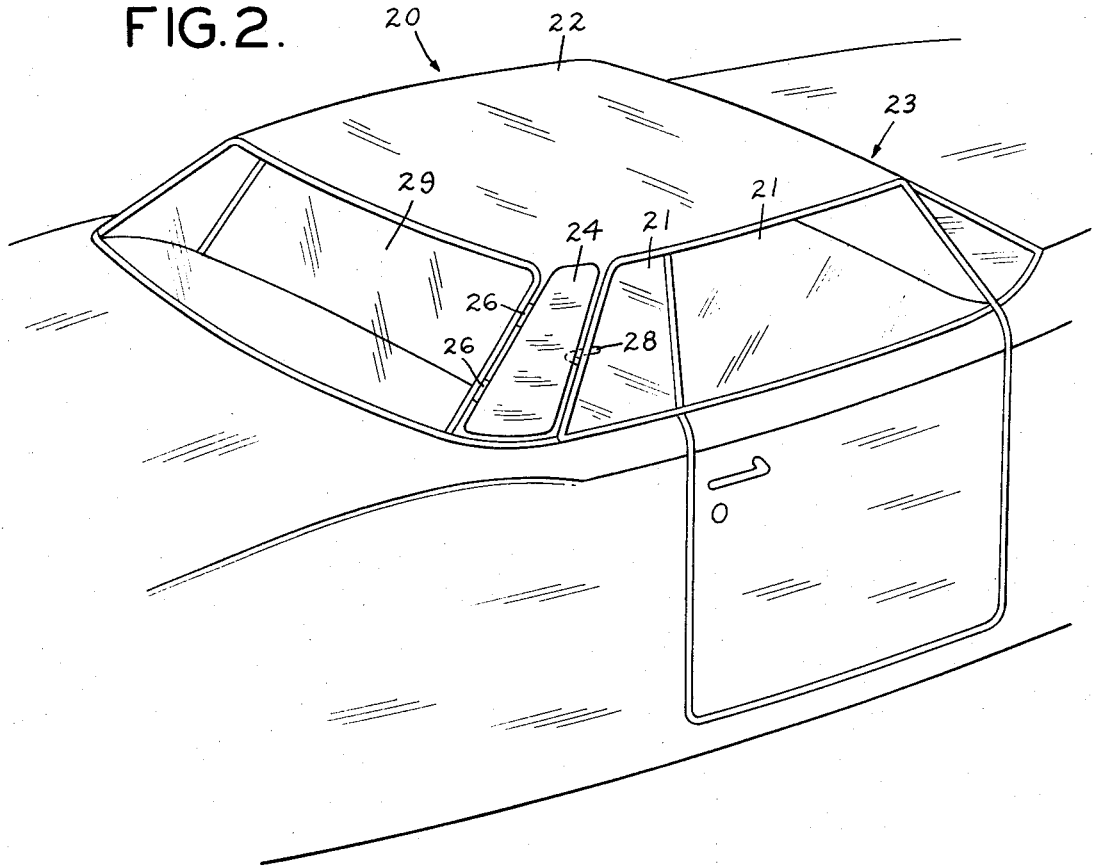
FIG. 2 is a schematic representation of the pressure relief means of the instant invention disposed at another point on the vehicle.

Turning to the drawings in detail, a motor vehicle 10 provided with a gas bag restraining system (not shown) is illustrated in FIG. 1. A panel 14 is disposed in the roof 12 of the vehicle 10. As illustrated in FIG. 3, the panel 14 is connected to the roof 12 by biased hinge means. By way of orientation, the front windshield is represented at 23. The biased hinge means comprises at least one biased hinge 16. In a preferred embodiment two hinges are employed. The biasing means, which urges each hinges 16 toward the open position is provided by a spring 8. To counteract the spring biased hinges 16 urging the panel 14 toward the open position, a hold down means, generally indicated at 18, disposed at the opposite side of the panel 14, opposes the biasing force and maintains the panel 14 in its closed position.

The hold down means 18, in a preferred embodiment, comprises a hook-like device 7, pivotable about a pin 4 disposed on the panel 14. The hook-like device 7 is connected to the roof 12 of the vehicle 10 by means of a second pin 6 about which the hook-like device 7 is disposed. A detonator means 2, in communication with an electrical signal, which is discussed below, is attached to the hook-like device 7 of the hold down means 18. The detonator means 2 may take the form of any one of many explosive charge devices known by those skilled in the art. Although only one hold down means 18 is shown in the preferred embodiment illustrated in FIG. 3, it should be appreciated that two or more hold down means may be substituted. The number of hold down means required is a function of the load bearing ability of the hook-like device 7 as well as the force exerted by the springs 8.

FIG. 2 illustrates an alternate preferred embodiment of the instant invention. In this case, a motor vehicle 20 is provided with two panels 24 disposed in the roof section 22 of the vehicle 20 between the back window 29 and the back end of the side windows 21. Although, each panel 24 is smaller than the panel 14 of FIG. 1, the total area of the two symmetrically disposed panels 24, in communication with the vehicle surroundings, is about the same as the single panel 14. The panels 24 are of the same design as the panel 14. Thus, each panel 24 is provided with at least one biased hinge means. In the preferred embodiment of FIG. 2 two biased hinge means 26 are provided. As in the single panel embodiment, at least one hold down means 28 oppose the biased means 26 to keep the panels 24 closed.

It should be appreciated that although FIGS. 1 and 2 disclose preferred embodiments which particularly define the position of the panels in the vehicle, other positions which are in communication with the passenger compartment of the vehicle and the vehicle surroundings may be substituted. Moreover, depending on the magnitude of the gas bags employed, a vehicle may be provided with a panel similar to panel 14, disposed in the roof, as well as a pair of panels 24 disposed between the back and side windows.

The operation of the pressure relief means will be explained by reference to FIG. 3. It should be understood that the method of operation of panels 24 in no way differs from the operation of panel 14, illustrated in FIG. 3, and thus the method to be described applies to any panel, in communication with the passenger compartment of the vehicle and the vehicle surroundings, no matter where situated on the vehicle.

Figure 4:
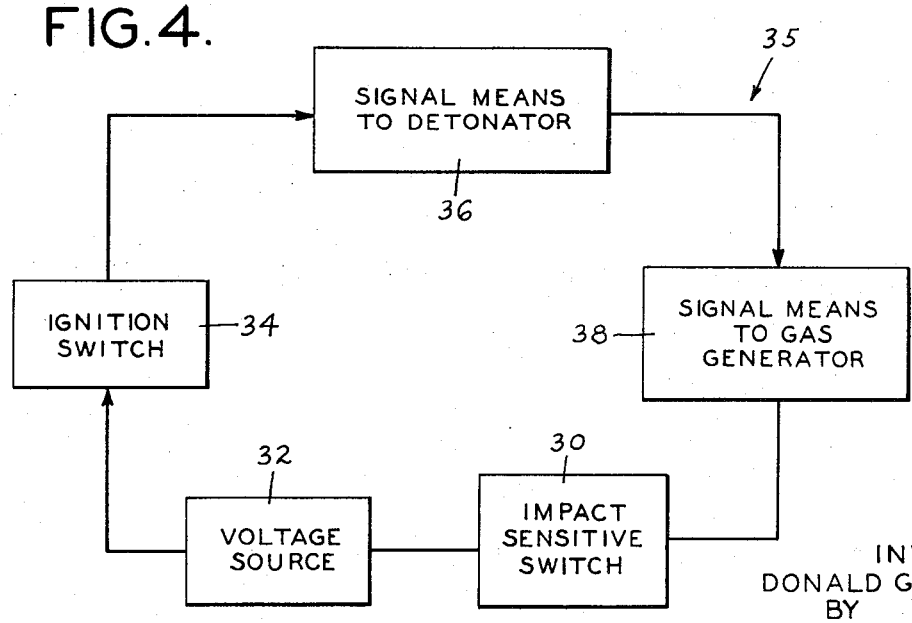
FIG. 4 is a schematic block diagram of the electrical system of the instant invention.

The panel 14 is normally held in the closed position by the hold down means 18 which acts against the bias of the hinge means 16. Referring now to FIG. 4, upon impact of the vehicle, an impact sensitive switch 30, is closed, activating an electrical circuit 35. The circuit 35 is powered by a voltage source 32. In a preferred embodiment, the voltage source 32 comprises the standard 12 volt D.C. storage battery of the vehicle. Alternately, a separate battery may be employed. It should be noted that the electrical flow in the circuit 35 is also dependent upon the closing of the ignition switch 34. Thus, the pressure relief system is never operable when the vehicle 10 engine is not running.

When the impact sensitive switch 30 is closed, following an impact of the operating vehicle 10, a signal 38 is transmitted to the gas generators provided in the vehicle. This signal 38 causes the gas generators, each in communication with at least one gas bag, to generate gas into the gas bags, to inflate them. Simultaneously, a second signal 36 is transmitted to the detonator means 2. The signal 36 causes the detonator means 2 to explode the hook-like device 7. The panel 14 is immediately opened, due to the urging of spring 8 in each biased hinge 16. This is illustrated in FIG. 3 by the position of the panel 14 shown in dotted lines. Thus, inflation of the gas bags occurs with the passenger compartment in communication with the vehicle surroundings. As a result, there is no buildup in pressure in the passenger compartment, eliminating the problems associated with gas bag inflation in a closed volume.

It should be understood that the above-described preferred embodiments of the instant invention are meant to be illustrative only. The foregoing specification and drawings will make apparent various modifications which are within the scope and spirit of the instant invention. Therefore, the scope of the instant invention should be limited only by the appended claims.

What is claimed is:

1. An assembly for prevention of pressure buildup in a vehicle equipped with a gas bag restraint system comprising:
   a. at least one panel, disposed in said vehicle, in communication with the passenger compartment of said vehicle and the vehicle surroundings;
   b. biased hinge means connecting said panel to the vehicle and urging said panel toward the open position;
   c. hold down means connecting said panel to the vehicle and maintaining said panel in the closed position against the urging of said biased hinge means; and
   d. detonator means, connected to said hold down means, for exploding said hold down means upon impact of said vehicle whereby said panel is opened during gas bag inflation to permit air into the passenger compartment to flow outside the compartment during inflation.

2. An assembly, as claimed in claim 1, including electrical circuit means in communication with said detonator means, said means comprising a voltage source, an impact sensitive switch responsive to impact of said vehicle and in electrical communication with said voltage source, whereby said detonator means is exploded by a signal generated by the closing of said switch.

3. An assembly, as claimed in claim 1, wherein said hold down means comprises at least one hook-like device pivotably connected to said panel, said device disposed about a pin, connected to said vehicle.

4. An assembly, as claimed in claim 1, wherein said biased hinge means comprises at least one spring loaded hinge.

5. An assembly, as claimed in claim 1, wherein at least one of said panel is disposed in the roof section of said vehicle.

6. A method for prevention of pressure buildup in the passenger compartment of a vehicle due to gas bag inflation comprising the steps of:
   disposing at least one panel on said vehicle in communication with said passenger compartment and said vehicle surroundings;
   providing said panel with a biased hinge means urging it in the open position;
   maintaining said panel closed by hold down means which acts against said biased hinge means; and
   disconnecting said hold down means upon impact of said vehicle whereby said panel is disposed in the open position due to the urging of said biased hinge means simultaneous with inflation of said bag filling a portion of said compartment within the vehicle upon impact, to permit air in the passenger compartment to flow outside the compartment during inflation.

7. A method, in accordance with claim 6, wherein said disconnecting of said hold down means is accomplished by detonating said hold down means.

8. A method, in accordance with claim 7, wherein said detonating of said hold down means is accomplished by transmitting a signal to said detonating means, disposed on said hold down means, said signal generated by an electrical circuit completed by closing of an impact sensitive switch.

* * * * *